US008268221B2

(12) United States Patent
Wano et al.

(10) Patent No.: US 8,268,221 B2
(45) Date of Patent: *Sep. 18, 2012

(54) PROCESS FOR PRODUCTION OF POLYTETRAFLUOROETHYLENE SHEET, AND PROCESS FOR PRODUCTION OF POLYTETRAFLUOROETHYLENE SEAL TAPE

(75) Inventors: Takashi Wano, Osaka (JP); Yozo Nagai, Osaka (JP); Yuri Horie, Osaka (JP); Atsushi Tanaka, Osaka (JP); Osamu Tabei, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/226,805

(22) PCT Filed: Apr. 27, 2007

(86) PCT No.: PCT/JP2007/059266

§ 371 (c)(1), (2), (4) Date: Oct. 28, 2008

(87) PCT Pub. No.: WO2007/126087

PCT Pub. Date: Nov. 8, 2007

(65) Prior Publication Data

US 2009/0166929 A1 Jul. 2, 2009

(30) Foreign Application Priority Data

May 1, 2006 (JP) ................................ 2006-127908
Oct. 12, 2006 (JP) ................................ 2006-278967

(51) Int. Cl.

| | |
|---|---|
| ***B29C 59/02*** | (2006.01) |
| ***B29C 67/00*** | (2006.01) |
| ***B01F 5/00*** | (2006.01) |
| ***B01F 15/00*** | (2006.01) |

(52) U.S. Cl. ........ 264/320; 264/117; 264/309; 264/330; 264/331.14; 366/137.1; 366/173.2

(58) Field of Classification Search .............. 366/137.1, 366/173.2; 264/117, 309, 320, 330, 331.14
See application file for complete search history.

(56) References Cited

U.S. PATENT DOCUMENTS 2,478,229 A 8/1949 Berry
(Continued)

FOREIGN PATENT DOCUMENTS

CN 1266397 9/2000
(Continued)

OTHER PUBLICATIONS

Satokawa, T. ed., "Handbook for Fluororesin", Nikkan Kogyo Shimbun, Ltd., 1990, pp. 116-125, 130, 141-142.

*Primary Examiner* — Yogendra Gupta
*Assistant Examiner* — Jeremiah Smith
(74) *Attorney, Agent, or Firm* — Hamre, Schumann, Mueller & Larson, P.C.

(57) ABSTRACT

Disclosed is a process for production of a polytetrafluoroethylene (PTFE) sheet, which is superior in productivity compared to conventional processes and can reduce the cost of production. Also disclosed is a process for production of a PTFE seal tape. The processes comprise the following steps (i) to (iii): (i) applying a force to a PTFE particle suspension comprising PTFE particles, a surfactant and water (a dispersion medium) so that the particles can come close to each other or contact with each other, thereby forming a PTFE-containing solid material having the water and the surfactant included therein; (ii) shaping the solid material into a sheet-like form; and (iii) reducing the water content in the sheet-like solid material.

54 Claims, 8 Drawing Sheets

U.S. PATENT DOCUMENTS

| | | | | | |
|---|---|---|---|---|---|
| 2,685,707 | A * | 8/1954 | Llewellyn et al. | 264/127 |
| 3,882,217 | A | 5/1975 | Banham et al. | |
| 4,049,589 | A * | 9/1977 | Sakane | 521/64 |
| 4,159,370 | A * | 6/1979 | Koizumi et al. | 526/73 |
| 4,177,334 | A | 12/1979 | Okita | |
| 4,225,547 | A | 9/1980 | Okita | |
| 5,074,671 | A * | 12/1991 | Roueche et al. | 366/172.1 |
| 5,148,806 | A | 9/1992 | Fukui et al. | |
| 5,463,021 | A | 10/1995 | Beyer et al. | |
| 5,516,209 | A | 5/1996 | Flint et al. | |
| 6,174,473 | B1 | 1/2001 | Levy et al. | |
| 6,270,707 | B1 | 8/2001 | Hori et al. | |
| 6,440,559 | B1 | 8/2002 | Asano et al. | |
| 2002/0161149 | A1 | 10/2002 | Kobayashi et al. | |
| 2004/0026805 | A1 * | 2/2004 | Cody et al. | 264/15 |
| 2009/0121377 | A1 * | 5/2009 | Wano et al. | 264/117 |
| 2009/0166929 | A1 | 7/2009 | Wano et al. | |

FOREIGN PATENT DOCUMENTS

| | | | |
|---|---|---|---|
| EP | 1 065 223 | | 1/2001 |
| EP | 1 291 367 | | 3/2003 |
| JP | 47-12332 | A | 6/1972 |
| JP | 5-112653 | A | 5/1993 |
| JP | 5-301267 | A | 11/1993 |
| JP | 6-192321 | A | 7/1994 |
| JP | 6-234865 | A | 8/1994 |
| JP | 7-290551 | A | 11/1995 |
| JP | 11-77787 | A | 3/1999 |
| JP | 11-246607 | | 9/1999 |
| JP | 2002-201217 | A | 7/2002 |
| JP | 2002-308914 | | 10/2002 |
| JP | 2002-370279 | A | 12/2002 |
| JP | 2003-522230 | A | 7/2003 |
| WO | WO 01/57096 | A1 | 8/2001 |

* cited by examiner

PROCESS FOR PRODUCTION OF POLYTETRAFLUOROETHYLENE SHEET, AND PROCESS FOR PRODUCTION OF POLYTETRAFLUOROETHYLENE SEAL TAPE

TECHNICAL FIELD

The present invention relates to a method of manufacturing a polytetrafluoroethylene (PTFE) sheet and a method of manufacturing a PTFE seal tape, both using a dispersion of PTFE particles as a starting material.

BACKGROUND ART

Since PTFE has properties such as high chemical resistance and low conductivity, a high melting point and excellent heat resistance, it is used for a variety of purposes mainly in chemical and electric fields. It is widely used for machinery purposes such as non-lubricated sliding components taking advantage of the property of a small friction coefficient or surface tension.

One type of PTFE product is a sheet-like product (PTFE sheet), which finds many applications depending on its form, including shape and thickness. For example, a strip-like PTFE sheet with a thickness of about several ten to several hundred micrometers suitably can be used as a seal tape to create a seal at the joint of pipes such as water pipes and gas pipes. The seal tape needs to be flexible enough to be forced into gaps at the joint, where it is required to serve as both a lubricant and a seal. The PTFE seal tape, with such properties and functions, widely has been used under the common name “raw tape” or “packing material.”

On the other hand, PTFE does not dissolve in most solvents except for specific solvents, and has the melting viscosity as high as in a range from $10^{10}$ Pa·s to $10^{11}$ Pa·s (from $10^{11}$ P to $10^{12}$ P) at a temperature of 380° C. Thus, various forming methods (such as extrusion and injection molding) used for forming general thermoplastic resin are not applied easily for manufacture of a PTFE product. These forming methods work with resin having melting viscosity upon formation generally in a range from $10^2$ Pa·s to $10^3$ Pa·s.

In one traditional method of manufacturing a PTFE sheet, sinter forming and cutting are used in combination. In this method, powdery PTFE particles (molding powder), used as a starting material, first are preformed at room temperature (forming aids may be added as needed at this point), and the resulting preform is heated at a temperature equal to or more than the melting point of PTFE (about 327° C.) to sinter (fire) the whole and obtain a cylindrical PTFE block (sinter forming). This is followed by cutting the outer periphery of the formed block to obtain a PTFE sheet (cutting method). Although a sheet with a relatively large thickness (for example, not less than 25 μm) may be obtained according to this method, the block size has to be enlarged for manufacturing sheets efficiently. In that case, preforming and firing take a long time (approximately from two to five days, depending on the block size) to inhibit the development of defects such as cracks due to heat distortion. Moreover, since the method is basically a batch process, continuous manufacture of a PTFE sheet from the starting material is difficult.

Another method of manufacturing a PTFE sheet is a paste extrusion method (fine powder method), which commonly is used to manufacture a PTFE seal tape. In this method, a forming aid is added to a fine powder to form a rod-like preform, which is then extruded with an extruder. The extruded paste then is spread into a sheet of a predetermined thickness using rollers, before the forming aid vaporizes. A PTFE seal tape is obtained by removing the forming aid from the sheet. A drawback of the paste extrusion method, however, is that it poses environmental concerns over the organic solvent, such as oil, used as the forming aid. Further, the method is not productive because it is a batch process requiring separate processes for the step of forming a preform and the step of extruding the preform.

JP5(1993)-301267A (Document 1) discloses a paste extrusion method using water as a forming aid. As described in Document 1, the method forms a paste suited for extrusion by removing water from a slurry containing an aggregate of PTFE and water, and uses this paste for extrusion. In order to reduce the content of water in the slurry, the slurry is passed slowly through a pipe provided with a slit or a gap of the shape and width that allow for passage of water but block the PTFE aggregate. Since there is no commercially available device that can realize such a procedure, the cost of equipment would be high if the method of Document 1 were to be performed. Further, a step of aggregating the PTFE will be needed when the slurry containing the PTFE aggregate and water is to be prepared from a dispersion of PTFE. Such a step is possible by, for example, adding a coagulant, such as an acid, to the dispersion heated to a predetermined temperature, and agitating the dispersion with an agitator. This step needs to be performed separately from the step that removes water from the slurry, which is a big obstacle to improving productivity.

Casting is another method of manufacturing a PTFE sheet. In casting, a dispersion of PTFE particles (a PTFE dispersion), which is a starting material, is applied on a support such as a metal plate and then dried and fired, followed by separating from the support for obtaining a PTFE sheet. According to this method, compared to the foregoing methods, a PTFE sheet is obtained that is thinner and less distorted. The thickness of a sheet obtained by one procedure of application, drying and firing, however, is considered to have an upper limit of about 20 μm for inhibiting minute defects called mud cracks, and a sheet with a thickness above 20 μm has to be obtained by repeating the application and firing of the dispersion a plurality of times.

The cutting method, paste extrusion method, casting and other methods of manufacturing a PTFE product are described in, for example, “Handbook for Fluororesin” (Takaomi Satokawa, ed., published by Nikkan Kogyo Shimbun, Ltd. in 1990 (description for the paste extrusion method on pages 122 to 124, for the cutting method on pages 141 to 142, for casting on page 130)).

Though not intended for the manufacture of a PTFE product, there are methods that apply a mechanical force to the dispersion of PTFE particles or the dispersion of fluorinated thermoplastic resin to form secondary particles (for example, PTFE fine powder) having a larger particle size than the original particles, as disclosed in JP2002-201217A (Document 2), JP6(1994)-192321A (document 3), and JP2003-522230T (Document 4). JP47(1972)-12332A (Document 5) discloses a method in which PTFE secondary particles having a larger particle size than the original particles are formed by applying a mechanical force after wetting the PTFE particles with an aqueous solution containing a surfactant.

DISCLOSURE OF INVENTION

As described, it has been difficult conventionally to form a PTFE sheet directly and continuously from a starting material containing PTFE particles. This has placed limitations on improving productivity. It is accordingly an object of the present invention to provide a manufacturing method of a PTFE sheet and a manufacturing method of a PTFE seal tape, that are more productive than conventional methods and less expensive in terms of the cost of production.

A method of manufacturing a PTFE sheet according to the present invention includes: (i) applying such a force to a PTFE particle dispersion containing PTFE particles, a surfactant, and water as a dispersion medium, that the particles approach or make contact with each other to form a PTFE-containing solid material including the water and the surfactant; (ii) deforming the solid material into a sheet form; and (iii) reducing a content of the water in the solid material deformed into a sheet form.

A method of manufacturing a PTFE seal tape according to the present invention includes: (i) applying such a force to a polytetrafluoroethylene particle dispersion containing polytetrafluoroethylene particles, a surfactant, and water as a dispersion medium, that the particles approach or make contact with each other to form a polytetrafluoroethylene-containing solid material including the water and the surfactant; (ii) deforming the solid material into a sheet form; and (iii) reducing a content of the water in the solid material deformed into a sheet form.

According to the present invention, a PTFE-containing solid material, moldable into a sheet form, can be obtained directly from a dispersion of PTFE particles. That is, the invention enables continuous production of a PTFE sheet or a PTFE seal tape from the starting material dispersion. A manufacturing method of the present invention is therefore more productive than traditional manufacturing methods of a PTFE sheet, and, since no organic solvents are used as forming aids, the method is more environmentally friendly than the traditional methods.

BEST MODE FOR CARRYING OUT THE INVENTION

Figure 1:
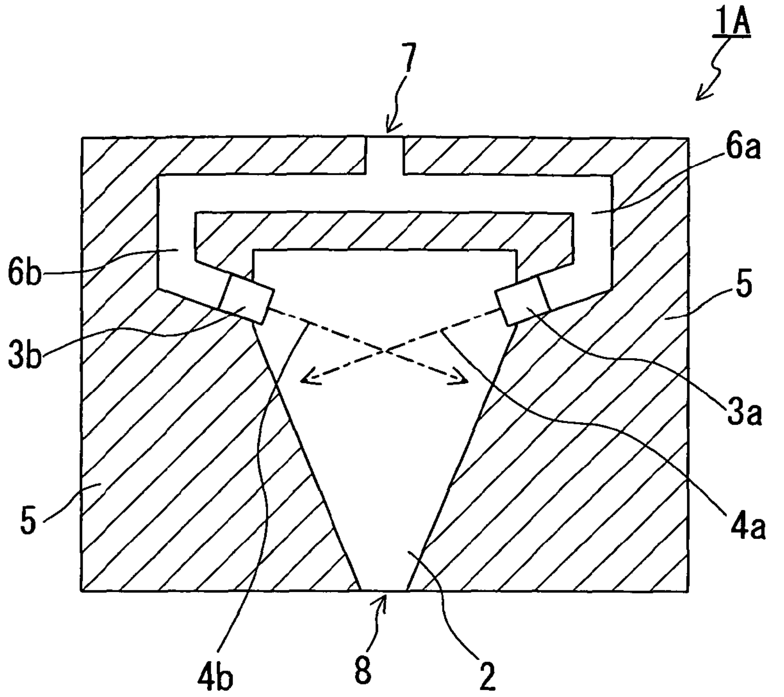
FIG. 1 is a schematic view showing an example of a chamber that can be used for a manufacturing method of the present invention.

According to a manufacturing method of the present invention, a PTFE-containing solid material (hereinafter, also referred to simply as "solid material") is formed that includes water as a dispersion medium and a surfactant (step (i)). Such solid material, as is clear from the method, is an aggregate formed by the binding of PTFE particles, and it cannot be obtained even as an intermediate by a conventional method of manufacturing a PTFE product. For example, a solid material including water and a surfactant is not formed by casting, which, as does a manufacturing method of the present invention, uses a dispersion of PTFE particles as the starting material, but removes water by drying while the PTFE particles are in a dispersed state.

The solid material formed in step (i) includes PTFE particles bound to the extent of maintaining a given form (having self-forming maintainability) and includes water to the extent of enabling the form to be deformable (having deformability). This solid material is deformable basically in an arbitrary form before being dried or fired, so that a PTFE sheet can be obtained by deforming the solid material in the form of a sheet (step (ii)) and then reducing the water content of the deformed solid material (step (iii)). One of the properties of the solid material is that it can undergo a wide range of deformation without being destroyed.

The solid material cannot be obtained even as an intermediate by the conventional methods of producing secondary particles as disclosed in the foregoing documents 2 through 5. In the methods disclosed in documents 2 through 4, a mechanical force is applied to the starting dispersion of fluorinated thermoplastic resin particles or PTFE particles, but no force is applied that forms the solid material. In the method disclosed in document 5, the starting material is not even a dispersion of PTFE particles, and as such no force is applied that forms the solid material.

For example, in the method of document 3, a coagulated phase (dense slurry) is obtained that can be diluted with water (paragraph [0008] and elsewhere, document 3). By contrast, the solid material formed in step (i) cannot be diluted with water. It can be described that the solid material is formed by bounding PTFE particles to such an extent as to be not dispersible in water.

Further, in the methods of documents 2 through 4 for example, the secondary particles are obtained by drying an collection of particles that results from application of a mechanical force to the dispersion of fluorinated thermoplastic resin particles or the dispersion of PTFE particles (for example, a force causing the PTFE particles to precipitate in the dispersion). In the method of document 5, the secondary particles are obtained by wetting the PTFE particles with an aqueous solution containing a surfactant, followed by application of a mechanical force and subsequent drying, and optional sieving. In contrast, the solid material formed in step (i) does not return to particles even when dried to remove water. It can be described that the solid material is formed by bounding PTFE particles to such an extent as not to return to particles in response to a reduction in the content of water in the solid material.

The reason such a solid material is obtained by step (i) is not entirely clear, but one possible explanation is that a mixed structure is formed in which the PTFE phase and the water phase mix with each other due to action of the surfactant in the dispersion. Although further studies are necessary to determine the structure of the solid material in detail, a possible mechanism accounting for the self-forming maintainability of the solid material is the continuation, to some extent, of the PTFE phase formed by the PTFE particles joined to each other. In some cases, a tighter binding stricture may be formed among the PTFE particles, or a network structure of PTFE may be formed due to partial fibrillation of the PTFE particles. In addition, a possible mechanism accounting for the deformability of the solid material is the stable presence of the water phase through the surfactant among the PTFE phases, which are hydrophobic.

The following will describe steps (i), (ii), and (iii) in detail.

In step (i), the method of applying force to the dispersion for making the PTFE particles approach or contact with each other is not particularly limited, and for example, the following methods may be used.

Method A. Supplying the dispersion to a chamber to apply the force in the chamber.

Method B. Spraying the dispersion to a target in order to apply the force.

Method C. Making the dispersion contact with a barrier disposed in a flow path of the dispersion and inhibiting a flow of the dispersion in order to apply the force.

In method A, the pressure generated in the chamber by supplying the dispersion can be used as the force that makes the PTFE particles further approach or contact with each other. As will be described later, a pipe (a first pipe) that discharges the solid material formed in the chamber, or a flow path (for example, a T-die) through which the solid material formed in the chamber is deformed into a sheet form may be connected to the chamber.

Specifically, to carry out the method A, the dispersion supplied to the chamber may be sprayed in the chamber (method A1) or passed through a narrowed space formed in the chamber (method A2).

The method A1 may be carried out by spraying the dispersion, for example, toward an inner wall of the chamber or a component placed in the chamber. When the dispersion collides with the inner wall or the component, a force is applied that makes the PTFE particles approach or contact with each other.

The method A1 enables the PTFE particles to collide with each other depending on factors such as the structure and the shape of the chamber and the conditions for spraying the dispersion. The method A1 also can apply the force to make the PTFE particles approach or contact with each other by causing the dispersion to collide with the solid material formed in the chamber. The solid material is formed continuously as the dispersion is sprayed onto the solid material formed in the chamber.

The dispersion may be sprayed through a nozzle having a spraying orifice, and the structure and the shape of the nozzle, for example the form of its spraying orifice, may be determined arbitrarily.

Similarly, to carry out the method B, the dispersion may be sprayed through a nozzle having a spraying orifice. Although the target for the method B may be defined arbitrarily, the space to have the target disposed therein preferably is sealed to inhibit scattering of the sprayed dispersion and to increase the proportion of the amount of obtained solid material to the amount of sprayed dispersion.

The spray pressure for the dispersion may be determined arbitrarily according to the conditions such as the content of the PTFE particles and that of the surfactant in the dispersion and the shape and the inner volume of the chamber. It should be noted, though, that an excessively low spray pressure may cause difficulty in obtaining the solid material.

According to the finding by the inventors of the present invention, the solid material forms immediately when a high spray pressure is employed in an early stage of spraying. Once the solid material is formed in the chamber, a lower spray pressure is sufficient to achieve subsequent, stable formation of the solid material. That is, the spray pressure for the dispersion may be different when starting the formation of the solid material and when the solid material is being formed continuously after a predetermined time period from the start of solid formation. Specifically, the spray pressure may be higher for the former and lower for the latter in order to save energy. It should be noted, however, that such high spray pressure is not always necessary to form the solid material.

The method A2 may be carried out without particularly limiting the shape of the narrowed space through which the dispersion passes, and for example, it may be in the form of a slit. The force to make the PTFE particles approach or contact with each other is applied to the dispersion when the dispersion passes through the slit.

The force may be applied to the dispersion by supplying the dispersion to the chamber through a plurality of feeders, so that the dispersions, supplied from the plurality of feeders, collide with each other in the chamber (method A3). According to the method A3, the PTFE particles may collide with each other depending on the structure or the shape of the chamber and the collision method.

In order to cause the dispersions to collide with each other in the chamber, the dispersions may be sprayed through the nozzles respectively disposed at the ends of the plurality of feeders, for example. In this case, the dispersions efficiently can collide with each other when at least two nozzles are disposed in the chamber with their spray directions crossing each other.

In method A3, as in the foregoing methods, the force to make the PTFE particles approach or contact with each other may be generated by causing the dispersion to collide with the solid material formed in the chamber. For example, in an early stage of solid material formation, formation of the solid material may be facilitated by causing a collision between the dispersions sprayed by two or more nozzles. Once the solid material is formed, the dispersions may be sprayed onto the solid material. In this way, the solid material continuously can be formed without interruption.

The method C may apply the force by, for example, supplying the dispersion to a pipe having the barrier (a second pipe). When the dispersion passes through the barrier disposed in the flow path (the second pipe), the flow of the dispersion may be turbulent or the dispersion may be stagnant partly, causing the generation of imbalanced pressures in the dispersion. Thus, the force is applied to the PTFE particles, making them approach or contact with each other.

The barrier may be, for example, a plate-like member, disposed inside the second pipe to create a narrow flow path therein. The barrier also may be formed by bending the second pipe, or by partially reducing the inner diameter of the second pipe. That is, the barrier may be a bent portion or a narrowed space of the second pipe. In this case, the method C also can be described as a method of supplying the dispersion to the second pipe having a bent portion or a narrowed space and then applying the force to make the PTFE particles approach or contact with each other at the bent portion or the narrowed space.

The dispersion may be supplied to the second pipe by spraying the dispersion from the nozzle, and in this case, the force can be applied efficiently to the PTFE particles. The nozzle for spraying may be the same as that for the method A1, and the spray pressure of the dispersion may be determined arbitrarily according to factors such as the content of the PTFE particles and that of the surfactant in the dispersion and the shape of the second pipe.

According to the method C, the PTFE particles may collide with each other depending on the structure or the shape of the second pipe and the conditions for supplying the dispersion. The method C also can apply the force to make the PTFE particles approach or contact with each other by causing the dispersion to collide with the solid material formed in the second pipe.

The shape, the inner diameter and the length of the second pipe and the shapes of the bent portion and the narrowed space are not particularly limited.

The methods A1 through A3, and the method B and the method C are examples of the method of applying the force to the dispersion of PTFE particles for making the PTFE particles included in the dispersion approach or contact with each other, and a manufacturing method of the present invention is not limited to the cases using the methods listed above.

The structure of the chamber, including the shape and the inner volume, for applying the force to the dispersion is not particularly limited, and commercially available devices (such as "Ultimizer" manufactured by Sugino Machine) may be utilized. "Ultimizer" is originally an atomizing dispersion device for pulverizing and atomizing various materials, such as pigments, fillers and catalysts, and the application for obtaining the PTFE particle-containing solid material was found by the present inventors.

FIG. 1 shows an example of the chamber. A chamber 1A shown in FIG. 1 has an inside space 2 in an approximately cone, a part of which is cut off near the bottom face, and a pair of nozzles 3*a* and 3*b* for spraying dispersions are disposed in the periphery to have their spraying orifices facing the inside space 2. The nozzles 3*a* and 3*b* are located to direct respective spray directions 4*a* and 4*b* crossing each other. The dispersions can be supplied to the nozzles 3*a* and 3*b* from a feed opening 7 through feeders 6*a* and 6*b* formed inside of a structure 5 of the chamber 1A. Near the apex of the inside space 2 in an approximately conical shape, an outlet 8 is formed to discharge the solid material formed in the chamber 1A (in the inside space 2). The form of the outlet 8 is not particularly limited, and for example, it may be in a circular form.

The chamber 1A shown in FIG. 1 supplies the pressurized dispersions to the nozzles 3*a* and 3*b* through the feed opening 7 and the feeders 6*a* and 6*b* to spray the dispersions into the inside space 2, so that the dispersions collide with each other (the method A3 is realized). In addition, using a chamber 1A having a similar structure but provided with only one nozzle or controlled appropriately the spray directions 4*a* and 4*b* of the nozzles 3*a* and 3*b*, the dispersions can be sprayed into the inside space 2 for colliding with the inner wall of the chamber 1A (a wall of the inside space 2) (the method A1 is realized). Preferably, the spray directions of the nozzles 3*a* and 3*b* are variable to perform such operations freely.

The chamber 1A preferably is structured to create a pressurized atmosphere in the inside space 2. In other words, the chamber 1A may be adapted to form the solid material in an atmosphere of pressure higher than atmospheric pressure. For this purpose, the chamber 1A may be provided with, for example, a pressure regulating mechanism, used to adjust the pressure inside the inside space 2. By increasing the pressure inside the chamber 1A, the force to make the PTFE particles approach or contact with each other can be applied to the dispersion more efficiently. A pressurized atmosphere inside the chamber 1A can be created without the pressure regulating mechanism, by appropriately adjusting parameters such as the cross sectional area of the outlet 8, and the length and number of pipes connected to the outlet 8, and by utilizing the spray pressure of the dispersion from the nozzles 3*a* and 3*b*. The same applies to chambers 1B through 1E, described below with reference to FIG. 2 through FIG. 5.

Figure 2:
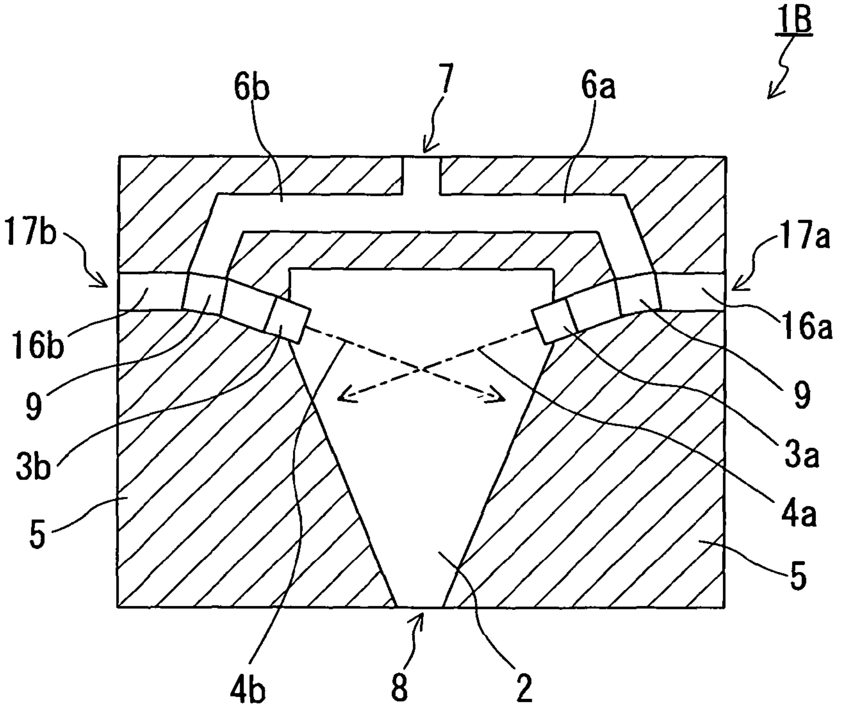
FIG. 2 is a schematic view showing another example of a chamber that can be used for a manufacturing method of the present invention.

The method of supplying the pressurized dispersions to the nozzles 3*a* and 3*b* is not particularly limited, and for example, the undivided dispersion pressurized by a high pressure pump may be supplied from the feed opening 7. Using the chamber 1B as shown in FIG. 2, the dispersions and water pressurized by a pump (pressurized water) may be supplied to mixing valves 9 formed right in front of the nozzles 3*a* and 3*b* through separate feeders and then mixed with the mixing valve 9 to be supplied to the nozzles 3*a* and 3*b*. In the chamber 1B shown in FIG. 2, the pressurized water and the dispersions are supplied to the mixing valves 9, the pressurized water through the feed opening 7 and the feeders 6*a* and 6*b*, and the dispersions through the feed openings 17*a* and 17*b* and the feeders 16*a* and 16*b*.

Figure 3:
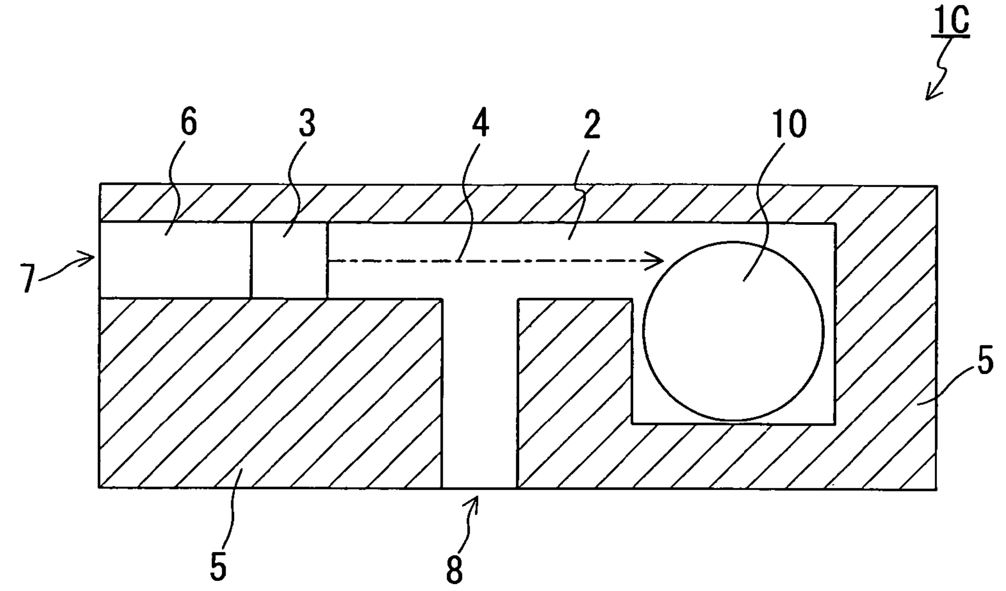
FIG. 3 is a schematic view showing still another example of a chamber that can be used for a manufacturing method of the present invention.

FIG. 3 shows another example of the chamber. A chamber 1C shown in FIG. 3 has an inside space 2 where a freely rotatable sphere 10 is disposed at one end and a nozzle 3 for spraying the dispersion is disposed at the other end to have a spraying orifice of the nozzle 3 face the inside space 2. The nozzle 3 and the sphere 10 are located to direct a spray direction 4 of the nozzle 3 crossing with the sphere 10. The dispersion is supplied to the nozzle 3 from a feed opening 7 through a feeder 6 formed inside a structure 5 of the chamber 1C. On a wall of the inside space 2 between the nozzle 3 and the sphere 10, an outlet 8 is formed to discharge the solid material formed in the chamber 1 (in the inside space 2).

The chamber 1C shown in FIG. 3 supplies a pressurized dispersion to the nozzle 3 through the feed opening 7 and the feeder 6, and the dispersion in the inside space 2 is sprayed for impacting the dispersion on the sphere 10, which is a component disposed in the chamber 1C (the method A1 is realized). For this operation, by disposing the nozzle 3 and the sphere 10 such that the spray direction 4 of the nozzle 3 strays from the center of the sphere 10, the sphere 10 can be rotated with a spray of the dispersion, and the abrasion inside the chamber 1C due to the collision of the dispersion can be inhibited.

The sphere 10 preferably employs a material not deformed by the collision of the dispersion, and for example, the sphere 10 may be made of a material, such as ceramic, metal (preferably alloys having higher hardness) or diamond.

Figure 4:
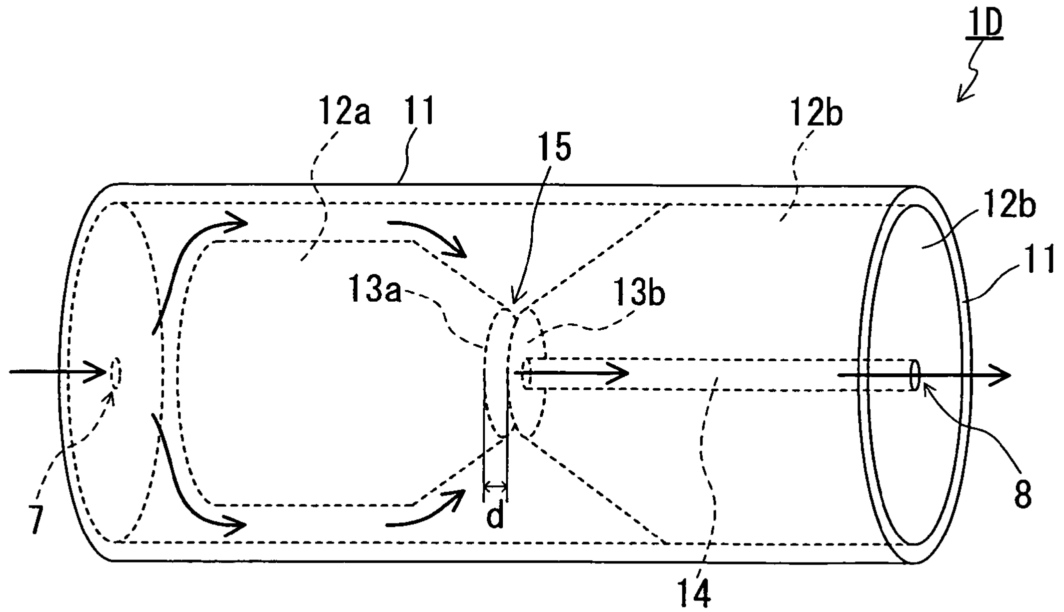
FIG. 4 is a schematic view showing yet another example of a chamber that can be used for a manufacturing method of the present invention.

FIG. 4 shows another example of the chamber. A chamber 1D shown in FIG. 4 has a cylindrical outer case 11 having a pair of inner units 12*a* and 12*b* installed inside. Each of the inner units 12*a* and 12*b* has the shape of a truncated cone joined on one end of a cylindrical column, and upper faces 13*a* and 13*b* of the truncated cones of the both inner units are disposed to face each other at a certain interval d. The central axes of the outer case 11 and the inner units 12*a* and 12*b* are substantially co-linear. At one end of the outer case 11, a feed opening 7 is formed to supply the dispersion. The inner unit 12*a*, the unit closer to the feed opening 7, has the outer diameter smaller than the inner diameter of the outer case 11, whereas the inner unit 12*b*, the unit farther from the feed opening 7, has the outer diameter identical to the inner diameter of the outer case 11. In addition, the inner unit 12*b* has an outlet channel 14 formed through the center of the upper face 13*b* and the inside of the inner unit 12*b* to the outside of the chamber 1. The inner unit 12*a* is supported by the outer case 11 through a support component (not shown).

Regulating the location of the inner units 12_a_ and 12_b_ for appropriately controlling the interval d enables a gap 15 to be defined between the upper faces 13_a_ and 13_b_ as the narrowed space in the form of a slit, and supplying the pressurized dispersion to the chamber 1D from the feed opening 7 enables the dispersion to pass through the narrowed space (the gap 15) disposed in the chamber (the method A2 is realized). The dispersion passes through the gap 15 and then pours into the outlet channel 14 to be discharged from an outlet 8 of the chamber 1 as a PTFE-containing solid material.

The pressure of the dispersion to be supplied (supply pressure) may be determined arbitrarily according to the shape and the inner volume of the chamber, the size of the interval d and the amount of the dispersion to be supplied. It should be noted, though, that it may be difficult to obtain the solid material when the supply pressure is excessively low.

Each of the chambers 1A through 1D shown in FIGS. 1 to 4 preferably has a pipe (a first pipe) connected to the outlet 8 and discharges the solid material through the connected pipe while keeping the solid material in contact with the entire inner wall of the pipe. It makes it possible to further apply the force for making the PTFE particles approach or contact with each other when the solid material discharged from the outlet 8 passes through the first pipe, and to obtain a solid material with more excellent self-forming maintainability and improved mechanical properties such as strength.

Such a solid material also can be made into a PTFE sheet with improved mechanical properties such as strength. For example, by appropriately selecting the properties such as the shape, the inner diameter and the length of the first pipe, a PTFE sheet can be obtained that has a tensile strength of not less than about 0.5 MPa in the MD direction (the direction of flow: the direction to be discharged from the pipe in this case), and a tensile strength of not less than about 1 MPa in the TD direction, after drying. A possible explanation for the improvement in the strength of the solid material and the sheet is that a skin layer in which the PTFE particles are more tightly joined to each other may be formed on the surfaces of the solid material and the sheet when they pass through the first pipe. It also may be the case that the friction generated between the surfaces of the first pipe and the solid material causes shear force inside the solid material for promoting further binding and joining the PTFE particles themselves. Discharging the solid material while keeping it in contact with the entire inner wall of the pipe may be enabled by appropriately selecting the form and the diameter of the outlet 8, and the shape, the inner diameter and the length of the pipe.

The shape, the inner diameter and the length of the first pipe to be connected is not particularly limited, and they may be determined arbitrarily according to the shape and the inner volume of the chamber 1 and the amount of the dispersion supplied to the chamber 1. Since the self-forming maintainability and mechanical properties of the obtained solid material basically tend to be more improved for a longer pipe, the length of the pipe is preferably greater than the minimum inner diameter of the pipe. As an example, when the processing speed of the dispersion is in a range from 0.1 L/min to 0.5 L/min, the inner diameter of the pipe connected to the chambers 1A through 1D may be in a range from 1 mm to 10 mm and the length of the pipe may be in a range from 1 mm to 5000 mm. In the case of the chamber 1D shown in FIG. 4, the outlet channel 14 may function as the pipe depending on the shape of the outlet channel 14.

In order to apply the force to the solid material more efficiently, the minimum inner diameter of the first pipe is preferably equal to or less than the diameter of the outlet 8. The pipe also may have inner diameters varying with the distance from the outlet 8 (i.e. be tapered inside), and in this case, the inner diameter preferably becomes smaller with the distance from the outlet 8.

Figure 5:
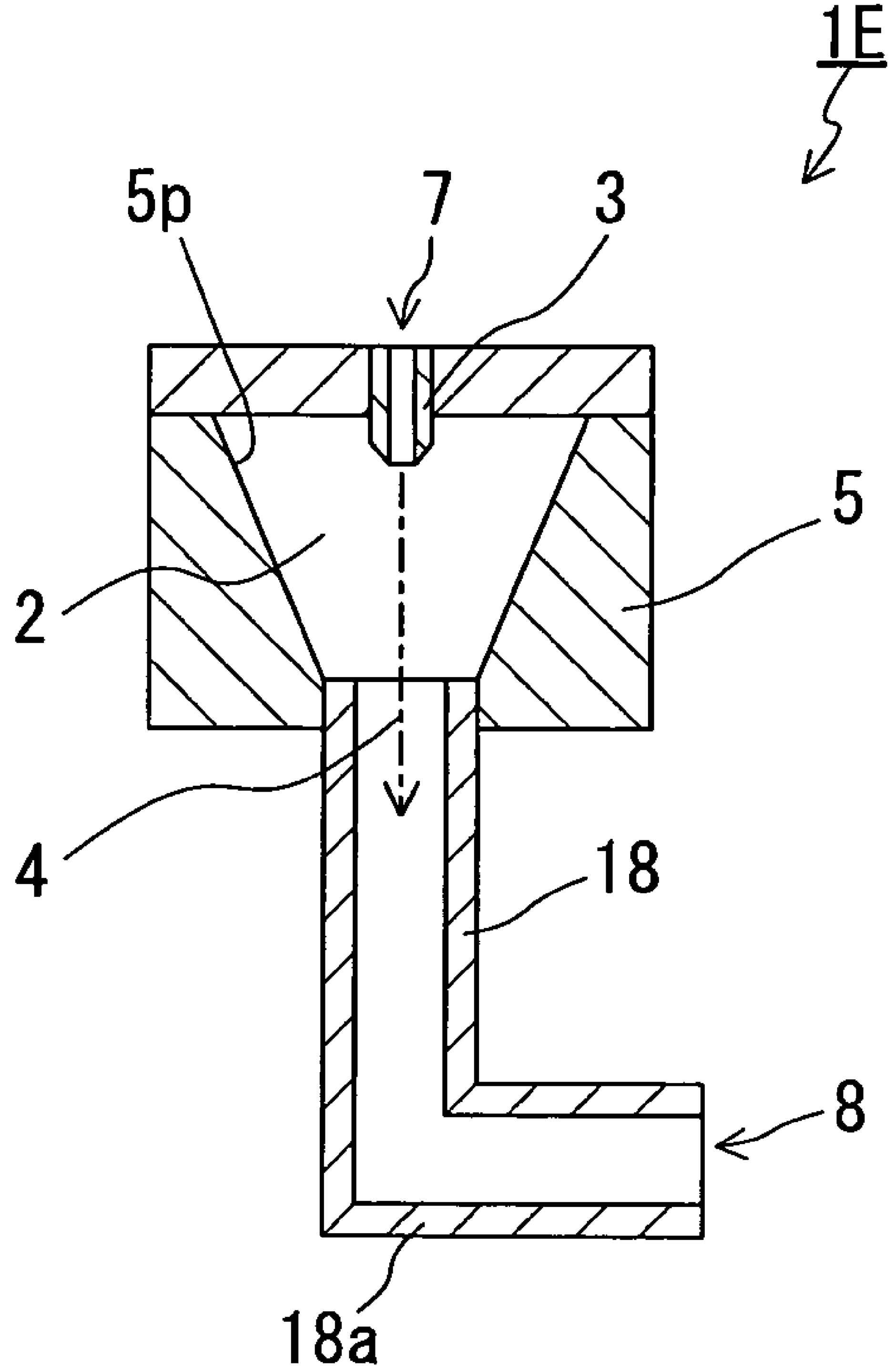
FIG. 5 is a schematic view showing still another example of a chamber that can be used for a manufacturing method of the present invention.

FIG. 5 illustrates another example of the chamber. A chamber 1E shown in FIG. 5 includes a structure 5 (chamber main body) equipped with a nozzle 3, and a pipe 18 connected to the structure 5 at one end and defining a dispersion outlet 8 at the other end. The pipe 18 may be a bent pipe (more specifically, L-shaped pipe). The spray direction 4 of the nozzle 3 is adjusted so that the dispersion sprayed from the nozzle collides with the inner wall surface of the bent pipe 18, or more specifically the inner wall surface at the bent portion 18_a_ of the bent pipe 18.

Figure 6:
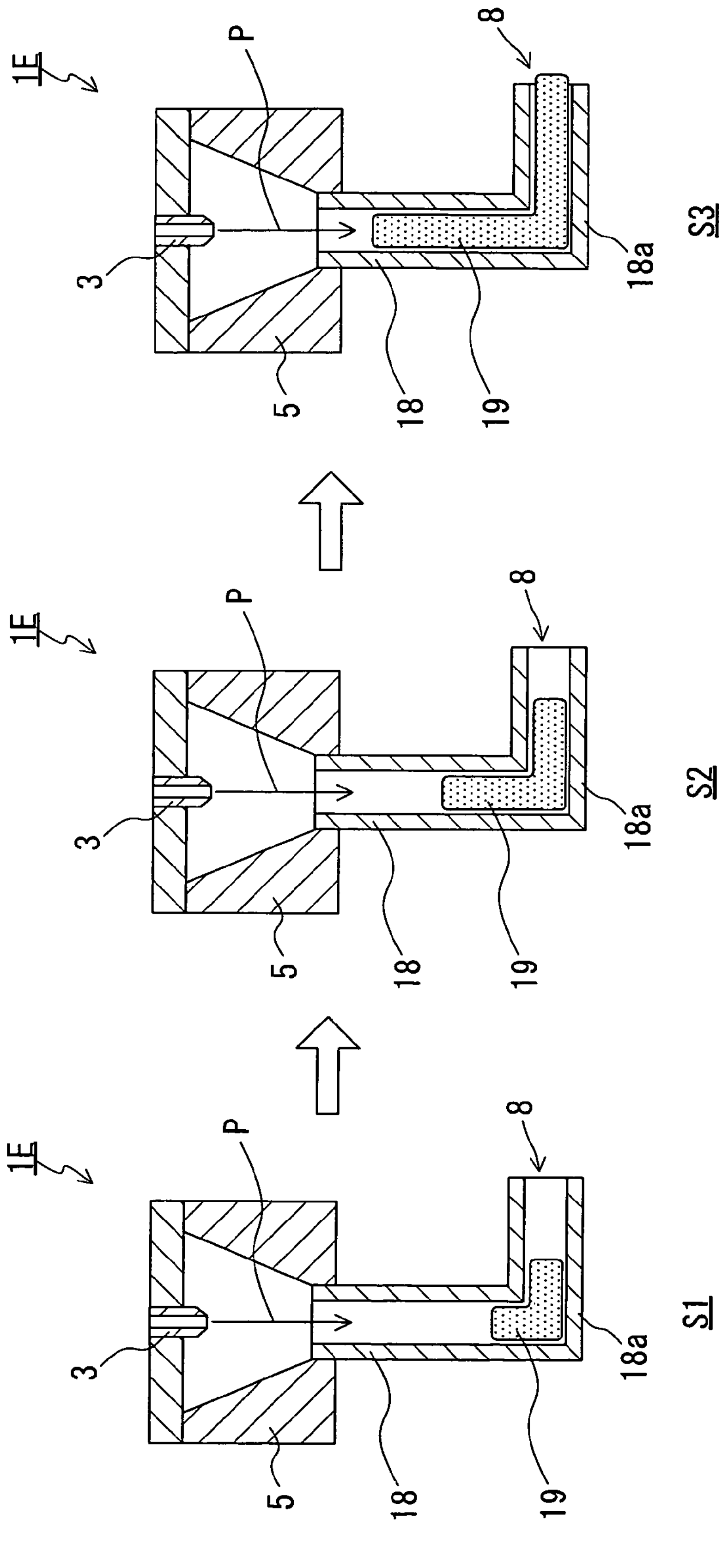
FIG. 6 is a schematic view serially showing formation of a PTFE-containing solid material in the chamber shown in FIG. 5.

As shown in FIG. 6, spraying the dispersion P onto the bent portion 18_a_ of the bent pipe 18 initiates formation of a solid material 19 at the bent portion 18_a_ (step S1). By continuously spraying the dispersion P onto the solid material 19 formed at the bent portion 18_a_, the solid material 19 grows and fills the space inside the bent pipe 18 (step S2). Eventually, the solid material 19 is discharged from the chamber 1E through the outlet 8 of the bent pipe 18 (step S3).

The spray direction 4 of the nozzle 3 is not just limited to the one described above. For example, the spray direction of the nozzle 3 may be adjusted so that the sprayed dispersion collides with an inner wall surface 5_p_ of the structure 5. In this case, it is preferable that the inner wall surface 5_p_ of the structure 5 be gradually tapered away from the portion connecting the nozzle 3 and the structure 5. In this way, the solid material formed inside the structure 5 can smoothly move into the bent pipe 18.

The temperature of the chambers 1A through 1E and the temperature of the dispersion supplied to the chambers 1A through 1E (processing temperature) shown in FIG. 1 through FIG. 5 are generally in a range from 0° C. to 100° C., preferably in a range from 25° C. to 80° C. and more preferably in a range from 25° C. to 50° C. In order to keep the processing temperature within the temperature range above, the chambers 1A through 1E may be provided with a cooling unit or a heating unit, as needed. Particularly when the chamber has a structure in which the dispersion is sprayed in the inside space 2, the chamber preferably has a cooling unit because the temperature of the system is increased by spraying.

In step (i), the solid material continuously can be obtained by continuously applying the force to the dispersion. That is, the solid material can be obtained by a continuous process, instead of a batch process. For example, the dispersion can be supplied continuously to the chambers 1A through IE shown in FIG. 1 through FIG. 5 to discharge the solid material from the chambers continuously. Further, the dispersion can be supplied continuously to the second pipe used in method C, in order to discharge the solid material from the pipe continuously, for example.

In this case, when the chamber or the pipe has no point of entry or exit for the material other than the feed opening and the outlet, the PTFE-containing solid material discharged from the chamber or the pipe can have substantially the same mass as the dispersion supplied to the chamber or the pipe. In early stages of such continuous production, there are cases where the dispersion flows out of the chamber, presumably due to insufficient force applied to the dispersion. However, once the applied force becomes sufficient and stable after this initial stage, the entire amount of the dispersion can turn into the PTFE-containing solid material. From this time point, the mass of the supplied dispersion will be the same as the mass of the product PTFE-containing solid material, excluding a trace amount of water that evaporates from the PTFE-containing solid material after the discharge. In this manner, according to a manufacturing method of the present invention, substantially all of the solid-containing liquid-phase starting material (dispersion) can be converted into a solid-phase intermediate (PTFE-containing solid material).

The solid material obtained by step (i), for example the solid material discharged from the outlet 8 shown in FIGS. 1 to 5, or from the second pipe used in method C may be deformed. The deformed form and deforming method are not particularly limited, and for example, a solid material in a string form is obtained by passing through the first pipe and a solid material in a sheet form is obtained by passing through a slit. Alternatively, the solid material may be passed through various dies (spinnerets) used for extrusion, and the solid material may be obtained in various forms such as in the forms of a string and a sheet by appropriately selecting the shape of the die. The solid material deformed in the form of a string or a sheet further may be subjected to deformation, for example by drawing or rolling.

Thus, according to step (i), the form of the solid material to be obtained offers a high degree of flexibility, and for example it is possible to obtain a solid material with the minimum thickness of not less than 20 μm, or above 20 μm depending on manufacturing conditions, such as not less than 1 mm or not less than 2 cm. In contrast, it is possible to obtain a solid material with the maximum thickness of up to 5 cm. The thickness of solid material means, for example, the diameter for a solid material in a string form and the thickness for a solid material in a sheet form.

The minimum thickness and the maximum thickness of the solid material to be obtained can be controlled by appropriately selecting the diameter of the outlet 8, the (minimum) inner diameter of the first pipe to be connected to the outlet 8, the (minimum) inner diameter of the second pipe and the shape of the die for deforming the solid material. For example, connecting the first pipe with above 20 μm of the minimum inner diameter to the outlet 8 makes it possible to obtain a solid material with above 20 μm of the maximum thickness (maximum diameter).

According to step (ii) of a manufacturing method of the present invention, the PTFE-containing solid material is deformed into a sheet form. The method by which the solid material is deformed into a sheet form is not particularly limited. For example, the solid material may be deformed into a sheet form by passing it through a flow path having a rectangular or slit-like cross section. In this case, a solid material in a sheet form having a cross section corresponding in shape to the cross section of the flow path can be obtained (hereinafter, such a solid material in a sheet form also will be referred to as a “sheet-like solid material”). As used herein, the cross section of the flow path means the cross section taken along the plane orthogonal to the direction of movement of the solid material.

The cross section of the flow path is not limited to rectangular or slit-like. It can be set appropriately according to the intended width or thickness of the product PTFE sheet. Further, the flow path may include portions where the cross section is not rectangular or slit-like, as long as the passage of the solid material therein produces a sheet-like solid material. As another suitable method, the solid material may be deformed into a sheet form by rolling, for example, through a pair or pairs of rotating rollers.

As a specific means of obtaining the sheet-like solid material, a slit die (T-die) may be used. In this case, the solid material formed in step (i) may be deformed into a sheet form through a slit die defining a flow path.

Figure 7:
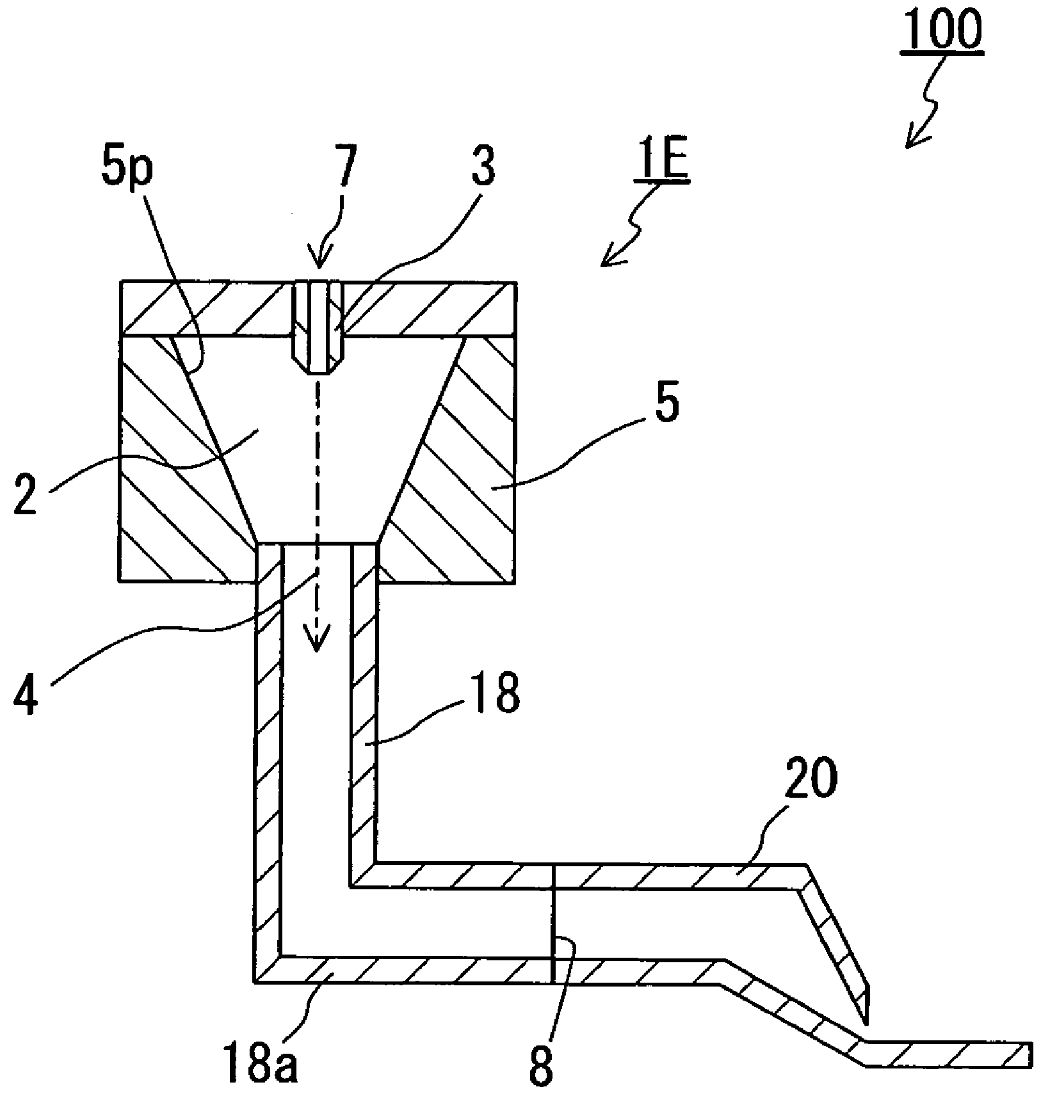
FIG. 7 is a schematic view showing an example of an apparatus, including a chamber equipped with a die used to deform a PTFE-containing solid material into a sheet form, that can be used to perform a manufacturing method of the present invention.

FIG. 7 schematically illustrates a PTFE sheet manufacturing apparatus, in which the chamber is equipped with a die used to deform the solid material into a sheet form. A PTFE sheet manufacturing apparatus 100 includes the chamber 1E, described with reference to FIG. 5, and a slit die 20 attached to the outlet 8 of the chamber 1E. In place of the chamber 1E, any of the chambers 1A through 1D described with reference to FIG. 1 through FIG. 4 may be used as well. When using the chambers 1A through 1D, the slit die 20 directly may be connected to the chamber, or via a joint member such as a pipe.

In the apparatus 100 shown in FIG. 7, the solid material formed in the bent pipe 18 (or the structure 5) of the chamber 1E is sent to the slit die 20 (T-die) through the outlet 8. Through the slit die 20, the solid material is deformed into a sheet form. The sheet-like solid material so obtained excels in mechanical properties such as strength and is easy to handle, allowing transport automation and improving the mechanical properties of the PTFE sheet produced by drying the sheet-like solid material. Though the reason for the improved strength of the sheet-like solid material is unclear, it appears to be due to the shear force that acts on the solid material as it passes through the bent pipe 18 or the slit die 20, forming a skin layer of strongly bound PTFE particles on the surface of the solid material, or due to the deformation of the solid material, promoting binding or fibrillation of the PTFE particles.

With a manufacturing method using the apparatus 100 shown in FIG. 7, a force to make the PTFE particles approach or contact with each other can be applied continuously to the dispersion to form a solid material, and the solid material immediately can be deformed into a sheet form. That is, it realizes a continuous process, not a batch process. Further, depending on the construction of the chamber 1E and/or the slit die 20, the mass of the dispersion supplied to the chamber 1E can be substantially the same as the mass of the sheet-like solid material discharged through the slit die 20.

The slit die may be connected to the second pipe used in method C.

Specifically, in step (ii), the solid material formed in step (i) may be deformed into a sheet form by passing it through a flow path having a rectangular or slit-like cross section and connected to the chamber or pipe.

Here, depending on the construction of the chamber, pipe, and flow path, the dispersion continuously can be supplied to the chamber or pipe to continuously discharge the solid material, deformed into a sheet form, through the flow path. In some cases, the solid material discharged through the flow path can have substantially the same mass as the dispersion supplied to the chamber or pipe.

In step (iii), the method of reducing the water content of the sheet-like solid material is not particularly limited. For example, this can be attained by drying the sheet-like solid material. Drying may be performed by, for example, heat drying or air drying. When drying the sheet-like solid material by heat drying, the conditions of heat drying can be appropriately set according to factors such as the thickness of the sheet-like solid material. For example, the sheet-like solid material may be heated to about 50° C. to 200° C. and maintained for about several seconds to one hour.

The PTFE sheet obtained in step (iii) (drying step) may be used directly as a final product, or may be sent to additional steps such as rolling and drawing, if needed. In other words, a step of rolling and/or drawing the sheet-like solid material may be performed after reducing the content of water in the sheet-like solid material in step (iii).

In the rolling step, the PTFE sheet is passed through a pair of rotating rollers to obtain a predetermined thickness. In the drawing step, the PTFE sheet is drawn at a predetermined rate, either uniaxially or biaxially. In either step, the PTFE sheet after the drying step is modified to satisfy the required specifications (for example, thickness, apparent density, mechanical strength) of the final product. These steps may be performed at the same time as the drying step.

As required, the PTFE sheet after the drying step or the rolling and/or drawing step may be fired by heating it to temperatures equal to or higher than the melting point of PTFE. In other words, a step of firing the sheet-like solid material may be performed after reducing the content of water in the sheet-like solid material in step (iii). In the firing step, as in the rolling and drawing steps, the PTFE sheet after the drying step is modified to satisfy the required specifications of the final product.

The method of firing is not particularly limited. For example, the sheet-like solid material after the drying step may be heated to temperatures equal to or higher than the melting point of PTFE (about 327° C. to 400° C., preferably 360° C. to 380° C.) as it is transported inside an electric furnace. The temperature and time of heating may be appropriately selected according to factors such as a thickness of the sheet-like solid material.

With a manufacturing method of the present invention, a PTFE sheet can be obtained that has a minimum thickness of 20 μm or greater, and, depending on manufacturing conditions of the solid material in step (i), a minimum thickness exceeding 20 μm, or more specifically, 1 mm or greater, or 2 cm or greater, for example.

In a manufacturing method of the present invention, the PTFE sheet obtained in steps (i) through (iii) may be a PTFE seal tape. The seal tape can be obtained by, for example, deforming the solid material into a required shape (for example, a strip, or a seal tape of a suitable thickness) in step (ii). Further, the rolling and/or drawing steps, or the shaping step may be performed after step (iii) to obtain a seal tape of a required shape. In step (ii), the solid material can be deformed into the shape appropriate for a seal tape by, for example, adjusting the slit width of the slit die 20 shown in FIG. 7.

With a method of the present invention, a PTFE seal tape having a thickness of, for example, 0.05 mm to 10 mm (preferably 0.08 mm to 5 mm) can be obtained with good productivity. When performing the rolling or drawing step after step (iii), a sheet-like solid material having a thickness of 0.2 mm to 20 mm (preferably 0.5 mm to 10 mm) may be prepared in step (ii), so that the product PTFE seal tape can have a sufficient thickness.

In the following, description is made as to the PTFE dispersion used as the starting material in a manufacturing method of the present invention.

The content of the PTFE particles in the dispersion is not particularly limited. The lower limit is, for example, 40 mass % or greater, and preferably above 40 mass %, more preferably above 45 mass %, further preferably 50 mass % or greater, and even more preferably 55 mass % or greater, in order to obtain a solid material with the excellent balance of self-forming maintainability and deformability. For the same reason, and taking into consideration the stability of the dispersion, the upper limit of the PTFE particle content should be, for example, 70 mass % or less, and more preferably 65 mass % or less. Although depending on the method and conditions to apply the force to the dispersion, a solid material with improved self-forming maintainability is obtained basically with a greater content of the PTFE particles in the dispersion and a solid material with improved deformability is obtained basically with a smaller content of the PTFE particles.

When forming a PTFE seal tape by a manufacturing method of the present invention, it is preferable that the content of PTFE particles in the dispersion fall in a range of from 40 mass % to 70 mass %, more preferably from 50 mass % to 65 mass %, and further preferably 55 mass % to 65 mass %, considering the apparent density of the product seal tape.

The average particle diameter of the PTFE particles is generally in a range of from 0.05 μm to 40 μm, preferably from 0.05 μm to 4 μm, further preferably from 0.1 μm to 1 μm, and even more preferably from 0.2 μm to 1 μm.

Although the content of the surfactant in the dispersion is not particularly limited, it preferably falls within a range of from 0.01 mass % to 15 mass %, more preferably from 0.1 mass % to 10 mass %, further preferably from 1 mass % to 9 mass %, even more preferably 1.5 mass % to 9 mass %, and yet more preferably 2 mass % to 7 mass %, in order to obtain a solid material with the excellent balance of self-forming maintainability and deformability. With the surfactant content in the preferable ranges, the PTFE-containing solid material readily can be obtained while suppressing separation of the PTFE phase from the water phase.

The type of surfactant is not particularly limited, and for example, an anionic surfactant such as carboxylate having a hydrocarbon skeleton, a nonionic surfactant such as a fluorine surfactant and a silicone surfactant may be used. Considering the stability of the dispersion, use of nonionic surfactants, such as polyoxyethylene alkyl ether, polyoxyalkylene alkyl ether, polyoxyethylene glyceride, and polyoxyethylene alkylphenyl ether, is preferable.

When a surfactant that decomposes at a temperature near the melting point of PTFE is used, the surfactant is decomposed when firing the obtained solid material, and thus the amount of surfactant that remains in the PTFE sheet formed by firing may be reduced successfully.

A commercially available PTFE dispersion may be used as the dispersion. The commercially available PTFE dispersion may be, for example, the AD series such as AD938, AD911, AD912, AD1, AD639 and AD936 manufactured by Asahi Glass Co., Ltd. (formerly manufactured by Asahi Glass Fluoropolymers Co., Ltd.) and the D series such as D1, D2 and D3 manufactured by Daikin Industries Ltd. Such commercially available PTFE dispersions generally contain a surfactant.

The dispersion may contain substances, for example, such as a filler, other than the PTFE particles, water and a surfactant. When the dispersion contains a filler, a filler-dispersed PTFE sheet can be obtained by drying the sheet-like solid material.

The type of filler is not particularly limited. For example, a powder filler or a fiber filler, either inorganic or organic, can be used. Generally, inorganic materials such as glass, carbon, metal, and ceramic are used. Electrical conductivity and heat conductivity are examples of the properties required for the PTFE seal tape. In view of improving electrical conductivity of the product seal tape, it is preferable to add conductive carbons, such as carbon black, carbon fiber, and graphite powder, to the dispersion. In view of improving heat conductivity, it is preferable to add, for example, boron nitride, to the dispersion.

When the dispersion contains a filler, it is preferable that the filler be uniformly dispersed in the dispersion in advance. When using the chamber 1B shown in FIG. 2, the dispersion may be mixed with filler-dispersed water at the mixing valve 9.

The content of the filler in the dispersion is generally 50 mass % or less, and preferably 30 mass % or less. When the content of the filler is too high, the solid material may not be obtained as desired.

As described, with a manufacturing method of the present invention, the PTFE sheet or PTFE seal tape can be-obtained continuously, without a pretreatment such as coagulation of a powder from the PTFE dispersion. A manufacturing method of the present invention is therefore more productive than traditional manufacturing methods, which are basically batch processes. Further, since continuous production is possible, the method readily allows for production of a long PTFE sheet and a long PTFE seal tape. Further, a manufacturing method of the present invention, performable with a very simple apparatus, can greatly reduce the cost of equipment compared with the traditional methods.

EXAMPLES

Hereinafter, the present invention is described more in detail with Examples. The present invention is not limited to the following examples.

Example 1

In Example 1, AD938 (the content of the PTFE particles: 60 mass %; the content of the surfactant: 3 mass %; average particle diameter of PTFE particles: 0.3 μm) manufactured by Asahi Glass Co., Ltd., a commercially available PTFE dispersion, was employed for the dispersion. A sheet-like solid material was formed with the chamber 1A shown in FIG. 1, and the formed sheet-like solid material was dried and fired to fabricate a PTFE sheet.

The volume of the inside space 2 of the chamber 1A (the inner volume of the chamber 1A) was 200 $cm^3$, a pair of nozzles 3*a* and 3*b* was disposed in the chamber each having a circular spraying orifice (ø 0.25 mm). Diamond was used for the part where the spraying orifice was formed at the nozzle head, and the nozzles 3*a* and 3*b* were disposed to cross the respective spraying directions 4*a* and 4*b* of the nozzles with each other. The outlet 8 (in a circular form, diameter of 10 mm) was connected with a pipe (a first pipe) having a cross section in a circular form, an inner diameter of 10 mm and a length of 1000 mm.

The dispersion was supplied to such chamber 1A, and the dispersion was sprayed from the nozzles 3*a* and 3*b* at the spray pressure of 200 MPa. The amount of the supplied dispersion was approximately 3 L/min, the temperature of the dispersion supplied to the chamber 1A (processing temperature) was 25° C. No heating was made to the chamber 1A.

Several seconds after spraying, a PTFE-containing solid material in the form of a string (in a cylindrical shape) was discharged from the head of the pipe. The discharged solid material included water and the surfactant, and it successfully maintained its form without a support.

Consequently, a T-die (a die lip gap of 320 μm) to shape the solid material into a sheet form was connected on an end face of the pipe on the other side of the end face connected to the outlet 8, and the dispersion was sprayed from the nozzles 3*a* and 3*b* in the same manner as above. The dispersion was continuously supplied to the chamber 1A, and a piece of aluminum foil was disposed under the discharge opening of the T-die as a support continuously receiving the sheet-like solid material discharged from the die and was moved at a speed of 2 m/min.

Several seconds after spraying, a sheet-like solid material (5 cm in width and 500 μm in thickness) was discharged continuously on the aluminum foil from the die. The discharged solid material included water and the surfactant, and successfully maintained its form without the aluminum foil as a support. After that, the obtained solid material was dried at a temperature of 90° C. for 15 minutes, followed by firing at a temperature of 370° C. for 10 minutes, and thus a PTFE sheet was obtained that had a uniform thickness (350 μm in thickness) without developing cracks.

Similar experiments were carried out by varying the diameter of the spraying orifice of the nozzle in a range from 0.05 mm (ø 0.05 mm) to 0.5 mm (ø 0.5 mm), the spray pressure in a range from 100 MPa to 300 MPa and the amount of the supplied dispersion in a range from 0.3 L/min to 30 L/min. As a result, similar PTFE sheets were fabricated.

Reference Example 1

In Reference Example 1, AD938 manufactured by Asahi Glass Co., Ltd. was employed for the dispersion. A solid material in a string form was formed with the chamber 1D shown in FIG. 4, and the formed solid material was dried and fired to fabricate a PTFE product in a string form.

The inner volume of the chamber 1D was 200 $cm^3$, and the interval d of the narrowed space in the form of a slit was 0.1 mm by controlling the location of the inner units 12*a* and 12*b*. The outlet 8 (in a circular form, 10 mm of diameter) was connected with a pipe (a first pipe) having the cross section in a circular form, the inner diameter of 1.6 mm and the length of 200 mm.

The dispersion pressurized at 245 MPa was supplied to the chamber 1D. The amount of the supplied dispersion was approximately 0.5 L/min and the temperature of the dispersion was 25° C. No heating was applied to the chamber 1.

Several seconds after the start of the supply of the dispersion, the PTFE-containing solid material in a string form (in a cylindrical shape) was discharged from the pipe head. The discharged solid material included water and the surfactant, and successfully maintained its form without a support.

Consequently, the obtained solid material was dried at a temperature of 90° C. for 30 minutes and then fired at a temperature of 370° C. for 20 minutes, and thus a PTFE product in a string form (in a cylindrical shape; diameter: 1.7 mm) was obtained without developing cracks.

Similar experiments were carried out by varying the supply pressure of the dispersion in a range from 100 MPa to 300 MPa and the interval d in a range from 1 μm to 1 mm. As a result, similar PTFE products were fabricated.

Reference Example 2

Figure 8:
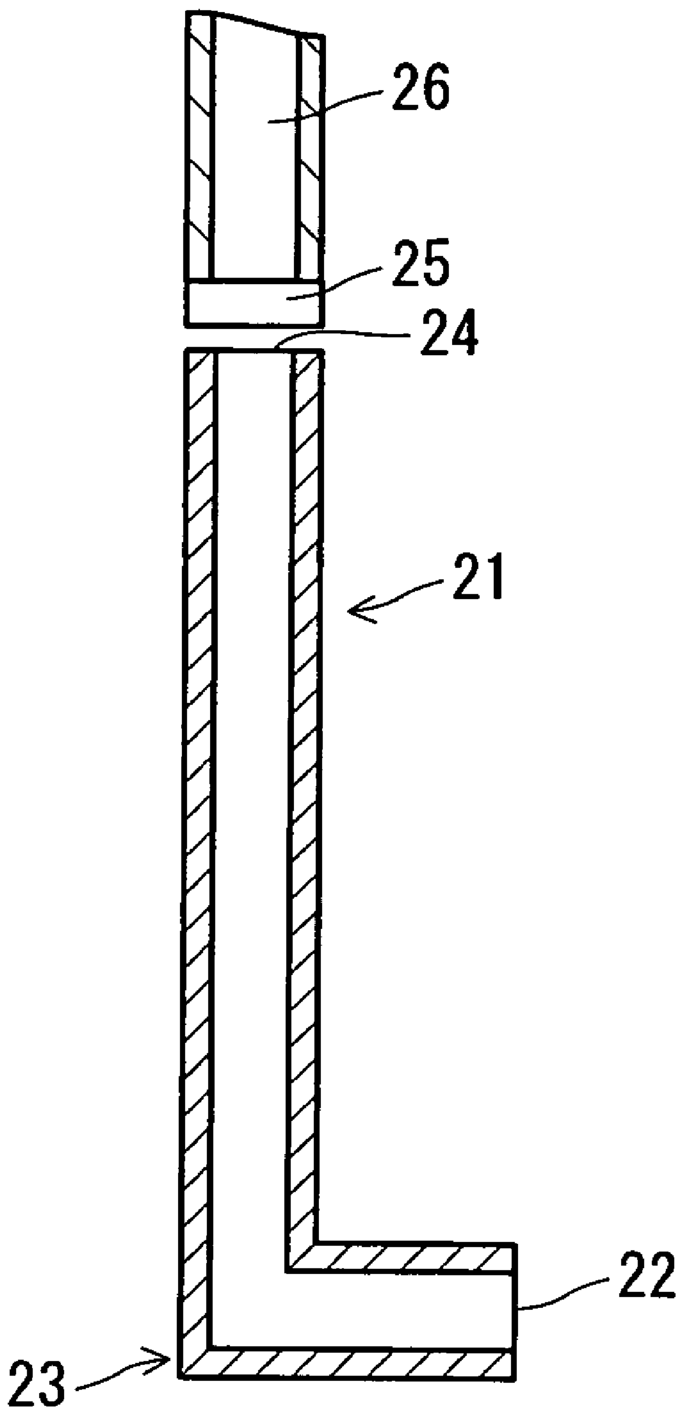
FIG. 8 is a schematic view illustrating a second pipe used in a Reference Example and a method of forming a PTFE-containing solid material with the second pipe.

In Reference Example 2, AD938 manufactured by Asahi Glass Co., Ltd. was employed for the dispersion. A PTFE solid material in a string form was formed with a pipe (a second pipe) 21 shown in FIG. 8. The pipe 21 had a bent portion 23 in the form of the letter L near one end 22 of the pipe 21 as a barrier inhibiting the flow of the dispersion. The pipe 21 had the inner diameter of 10 mm and the length 200 mm, and the bent portion 23 was located at a distance of 30 mm from the end 22 of the pipe 21.

A nozzle 25 (having a circular spraying orifice (ø 0.15 mm)) disposed at the end of the feeder 26 for the dispersion was located on the central axis of the pipe 21 described above. The nozzle 25 and the pipe 21 were disposed so that the other end 24 of the pipe 21 and the nozzle 25 were 5 mm, distant from each other (refer to FIG. 8), and then the dispersion was sprayed inside the pipe 21 from the nozzle 25 at the spray pressure of 160 MPa. The amount of the dispersion supplied to the nozzle 25 was approximately 0.5 L/min and the temperature of the dispersion was 25° C. No heating was made to the pipe 21.

Several seconds after the start of spraying, the PTFE-containing solid material in a string form was discharged from the one end 22 of the pipe 21. The discharged solid material included water and the surfactant, and successfully maintained its form without a support.

Similar experiments were carried out by varying the spray pressure of the dispersion. As a result, similar PTFE-containing solid materials were obtained even in the cases of the spray pressure at 200 MPa and 245 MPa.

In addition, similar experiments were carried out by varying the content of PTFE particles in the dispersion. As a result, similar PTFE-containing solid materials were obtained even in the cases of the content of 54 mass % and 48 mass %.

Reference Example 3

Figure 9:
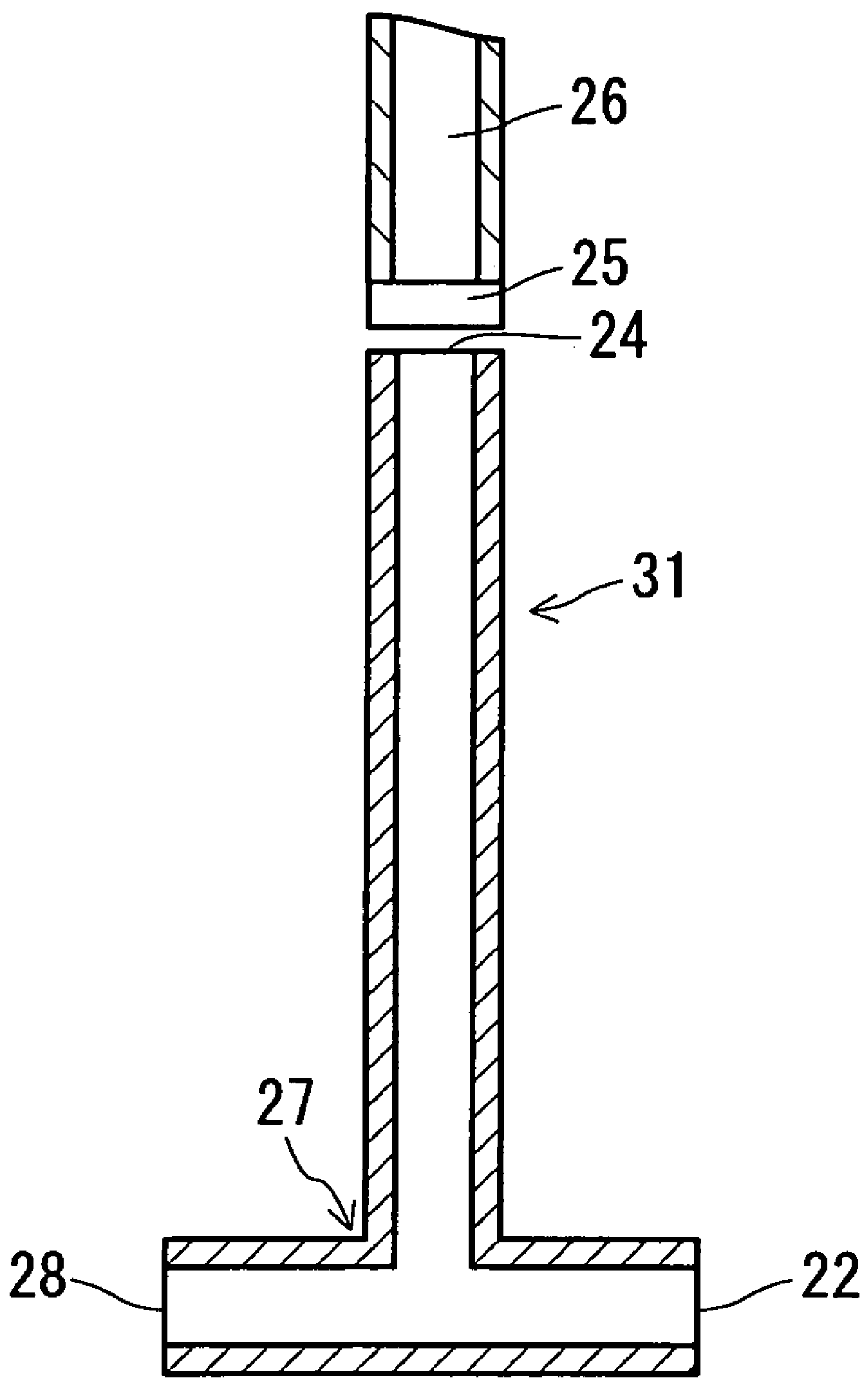
FIG. 9 is a schematic view illustrating a second pipe used in a Reference Example and a method of forming a PTFE-containing solid material with the second pipe.

In Reference Example 3, AD938 manufactured by Asahi Glass Co., Ltd. was employed for the dispersion. A PTFE solid material in a string form was formed with a pipe (a second pipe) 31 shown in FIG. 9. The pipe 31 had a bent portion 27 in the shape of the letter T near one end 22 of the pipe 31 as a barrier inhibiting the flow of the dispersion. The inner diameter of the pipe 31 was 10 mm and the length (the length from the one end 22 to the other end 24) was 200 mm, and the bent portion 27 was located 30 mm distant from the one end 22 of the pipe 31.

A nozzle 25 (having a circular spraying orifice (ø 0.15 mm)) disposed at the end of the feeder 26 for the dispersion was located on the central axis of the pipe 31 described above. The nozzle 25 and the pipe 31 were disposed so that the other end 24 of the pipe 31 and the nozzle 25 were 5 mm distant from each other (refer to FIG. 9), and then the dispersion was sprayed inside the pipe 31 from the nozzle 25 at the spray pressure of 245 MPa. The amount of the dispersion supplied to the nozzle 25 was approximately 0.5 L/min and the temperature of the dispersion was 25° C. No heating was made to the pipe 31.

Several seconds after the start of spraying, a PTFE-containing solid material in a string form was discharged from the one end 22 of the pipe 31. The discharged solid material included water and the surfactant, and successfully maintained its form without a support. During this process, the PTFE-containing solid material in a string form was not discharged from an end 28 composing the open ends of the "T letter" part together with the end 22. The spraying procedure was carried out a plurality of times, and, in each case, the PTFE-containing solid material in a string form was discharged from either one of the end 22 and the end 28.

Similar experiments were carried out by varying the spray pressure of the dispersion. As a result, similar PTFE-containing solid materials were obtained even in the case of the spray pressure at 200 MPa.

In addition, similar experiments were carried out by varying the content of PTFE particles in the dispersion. As a result, similar PTFE-containing solid materials were obtained even in the cases of the content of 54 mass % and 48 mass %.

Reference Example 4

Figure 10:
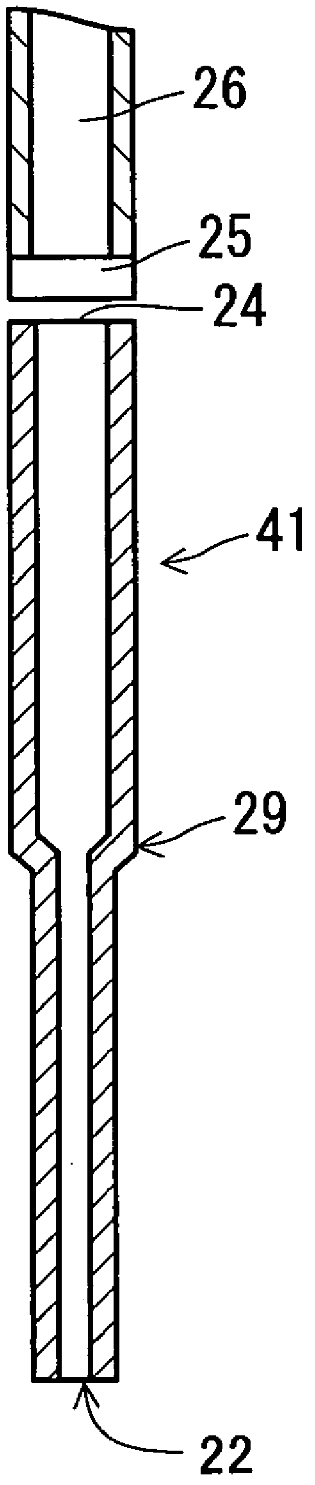
FIG. 10 is a schematic view illustrating a second pipe used in a Reference Example and a method of forming a PTFE-containing solid material with the second pipe.

In Reference Example 4, AD938 manufactured by Asahi Glass Co., Ltd. was used for the dispersion, and a PTFE solid material in a string form was formed with a pipe (a second pipe) 41 shown in FIG. 10. The pipe 41 had a narrowed space 29 of a varying inner diameter at the center in the longitudinal direction, as a barrier inhibiting the flow of the dispersion. The length of the pipe 41 was 400 mm, and the pipe 41 had the inner diameter of 2 mm over a 200 mm range from one end 22, and had the inner diameter of 10 mm over a 200 nm range from the other end. That is, the pipe 41 had the inner diameter varying from 10 mm to 2 mm at the narrowed space 29.

A nozzle 25 (having a circular spraying orifice (ø 0.15 mm)) disposed at the end of the feeder 26 for the dispersion was located on the central axis of the pipe 41 described above. The nozzle 25 and the pipe 41 were disposed so that the end 24 of the pipe 41, having the inner diameter of 10 mm, and the nozzle 25 were 5 mm distant from each other (refer to FIG. 10), and then the dispersion was sprayed inside the pipe 41 from the nozzle 25 at spray pressure of 245 MPa. The amount of the dispersion supplied to the nozzle 25 was approximately 0.5 L/min and the temperature of the dispersion was 25° C. No heating was applied to the pipe 41.

Several seconds after the start of spraying, a PTFE-containing solid material in a string form was discharged from the one end 22 of the pipe 41. The discharged solid material included water and the surfactant, and successfully maintained its form without a support.

Similar experiments were carried out by varying the spray pressure of the dispersion. As a result, similar PTFE-containing solid materials were obtained even in the case of the spray pressure at 200 MPa.

In addition, similar experiments were carried out by varying the content of PTFE particles in the dispersion. As a result, similar PTFE-containing solid materials were obtained even in the cases of the content of 54 mass % and 48 mass %.

Example 2

The sheet-like solid material, undried, obtained in Example 1 was kept in water. The solid material maintained its shape even after 365 days.

The sheet-like solid material, undried, obtained in Example 1 was dried at 90° C. for 15 minutes. The solid material was then placed on a 1 μm mesh sieve and the sieve was shaken. No particulate material came through the sieve.

Example 3

In Example 3, D-2 (the content of the PTFE particles: 60 mass %; the content of the surfactant: 6 mass %) manufactured by Daikin Industries Ltd., a commercially available PTFE dispersion, was employed for the starting material dispersion. A PTFE-containing solid material in a string form was formed with the chamber 1E shown in FIG. 5, and the formed solid material was rolled and dried to fabricate a PTFE seal tape.

The volume of the inner space 2 of the chamber 1E (inner volume of the chamber 1E) was 30 $cm^3$, and a nozzle 3 having a circular spraying orifice (ø 0.25 mm) was disposed in the chamber. As the bent pipe 18, a cylindrical L-shaped pipe (inner diameter ø: 18 mm; length: 200 mm; the bent portion 18*a* substantially at the center) was used.

The dispersion was supplied to the chamber 1E, and the dispersion was sprayed from the nozzle 3 at a spray pressure of 230 MPa. The spray rate of the dispersion was about 0.5 L/min. The temperature of the dispersion was 23° C. No temperature control was used for the chamber 1E.

About twenty seconds after the start of spraying, a solid material in a string form (outer diameter: 20 mm) was discharged from the head of the bent pipe 18. It was confirmed by analysis that the discharged solid material included water and the surfactant.

The resulting solid material in a string form was rolled three times by a pair of metal rollers heated to 60° C., each time varying the distance between the rollers. As a result, a sheet-like solid material having a thickness of 0.13 mm was obtained. The sheet-like solid material so obtained was dried for 3 minutes in a 150° C. atmosphere inside a drying furnace, so as to obtain a PTFE seal tape (thickness: 100 μm).

Example 4

As shown in FIG. 7, a slit die 20 (slit width: 100 mm; gap: 2 mm) was attached to the chamber 1E used in Example 3, and the dispersion was sprayed under the same conditions used in Example 3. A resulting sheet-like solid material, discharged from the head of the slit dice 20, was collected. The sheet-like solid material was passed through a pair of metal rollers heated to 60° C., so as to adjust the thickness to 0.15 mm. The material was then dried in a 150° C. atmosphere inside a drying furnace, while being drawn two times lengthwise using two pairs of rollers having a speed difference by a factor of two. As a result, a PTFE seal tape was obtained.

The properties of the PTFE seal tapes obtained in Examples 3 and 4 were evaluated by measurement as follows, according to JIS K 6885 (2005) "Unsintered Polytetrafluoroethylene Tapes for Thread Sealing." The results are shown in Table 1 below. Table 1 also shows data for JIS Class 1 and Class 2 at the bottom.

(1) Thickness (mm)

Thickness was measured with a dial gauge (contact face: diameter of 10 mm, load of 1 N).

(2) Apparent Density (g/cm$^3$)

Apparent density was calculated according to Equation (1) below, from the measured size and mass of each test piece.

$$\rho = m/(l \times b \times d) \quad (1)$$

ρ: Apparent density (g/cm$^3$)

l: Length of test piece (cm)

b: Width of test piece (cm)

d: Thickness of test piece (cm)

m: Mass of test piece (g)

(3) Tensile Strength (MPa) and Elongation (%)

A test piece, about 20 cm long, was sampled, and marked lines, separated by a distance of 50 mm, were traced at the center of the test piece. Using a Tensilon tensile tester, the test piece was stretched at a rate of 200 mm/min, and the maximum load and the distance between the marked lines were recorded at the breaking point. From the results of measurement, the tensile strength and elongation were respectively calculated according to Equations (2) and (3) below.

$$T = F/(b \times d) \quad (2)$$

T: Tensile strength (MPa)

F: Maximum load at the breaking point (N)

b: Width of test piece (mm)

d: Thickness of test piece (mm)

$$E = 100 \times (l_2 - l_1)/l_1 \quad (3)$$

E: Elongation (%)

$l_1$: Initial distance between the marked lines on the test piece (mm)

$l_2$: Distance between the marked lines at the breaking point (mm)

TABLE 1

| | Thickness (mm) | Apparent density (g/cm$^3$) | Tensile strength (MPa) | Elongation (%) |
|---|---|---|---|---|
| Example 3 | 0.11 | 1.2 | 9 | 40 |
| Example 4 | 0.10 | 1.1 | 11 | 80 |
| <Reference> | | | | |
| JIS Class 1 | 0.10 ± 0.02 | 1.4 or greater | 7.0 or greater | 20 or greater |
| JIS Class 2 | 0.10 ± 0.02 | 1.0 or greater and less than 1.4 | 7.0 or greater | 20 or greater |

As shown in Table 1, the PTFE seal tapes of Examples 3 and 4 both satisfied the criteria for JIS Class 2.

Comparative Example

In Comparative Example, AD938 manufactured by Asahi Glass Co., Ltd. was employed for the dispersion, and the fabrication of a PTFE sheet with a thickness of 300 μm was attempted by casting.

The dispersion was applied on a surface of an aluminum substrate (application thickness: 600 μm), and the whole was dried at a temperature of 120° C. for 15 minutes, followed by firing at a temperature of 380° C. for 10 minutes. Although PTFE in a sheet form was formed on the substrate, the formed PTFE developed countless cracks and did not maintain its form of a sheet when it was separated from the substrate.

The invention may be embodied in other forms without departing from the spirit or essential characteristics thereof. The embodiments disclosed in this description are to be considered in all respects as illustrative and not limiting. The scope of the invention is indicated by the appended claims rather than by the foregoing description, and all changes that come with the meaning and range of equivalency of the claims are intended to be embraced therein.

Industrial Applicability

According to the present invention, novel methods of manufacturing a PTFE sheet and a PTFE seal tape are provided in which a dispersion of PTFE particles is their starting material. Manufacturing methods of the present invention enable manufacture of a PTFE sheet and a PTFE seal tape with improved productivity.

The invention claimed is:

1. A method of manufacturing a polytetrafluoroethylene sheet, the method comprising:

(i) providing a dispersion containing water as a dispersion medium, polytetrafluoroethylene particles, and a surfactant, applying a force to the dispersion, the force making the particles approach or contact with each other, thereby binding the particles to form a deformable polytetrafluoroethylene-containing solid material including the water, the surfactant and the bound particles, and discharging the formed solid material from an outlet of a chamber, wherein the force is applied in the chamber by spraying the dispersion to an inner wall of the chamber or a component in the chamber;

(ii) deforming the solid material into a sheet form; and (iii) reducing a content of the water in the solid material deformed into the sheet form.

2. The method of manufacturing a polytetrafluoroethylene sheet according to claim 1, wherein the dispersion is sprayed through a nozzle.

3. The method of manufacturing a polytetrafluoroethylene sheet according to claim 1, wherein the particles in the solid material are bound to each other to such an extent as to retain a given form of the solid material, and wherein the solid material contains the water to such an extent that the given form is deformable.

4. The method of manufacturing a polytetrafluoroethylene sheet according to claim 1, wherein the particles in the solid material are bound to each other to such an extent as to be not dispersible in water.

5. The method of manufacturing a polytetrafluoroethylene sheet according to claim 1, wherein the particles in the solid material are bound to each other to such an extent as not to return to particles in response to a reduction in the content of the water in the solid material.

6. The method of manufacturing a polytetrafluoroethylene sheet according to claim 1, wherein the solid material is deformed into a sheet form by rolling.

7. The method of manufacturing a polytetrafluoroethylene sheet according to claim 1, wherein the solid material is deformed into a sheet form by being passed through a flow path having a rectangular or slit-like cross section.

8. The method of manufacturing a polytetrafluoroethylene sheet according to claim 1, wherein the solid material is deformed into a sheet form by being passed through a flow path having a rectangular or slit-like cross section and connected to the chamber.

9. The method of manufacturing a polytetrafluoroethylene sheet according to claim 8, wherein the dispersion is continuously supplied to the chamber, so as to continuously discharge the solid material, deformed into a sheet form, through the flow path.

10. The method of manufacturing a polytetrafluoroethylene sheet according to claim 9, wherein the solid material discharged through the flow path has substantially the same mass as the dispersion supplied to the chamber.

11. The method of manufacturing a polytetrafluoroethylene sheet according to claim 1, wherein the dispersion further contains a filler.

12. The method of manufacturing a polytetrafluoroethylene sheet according to claim 1, wherein the content of the water in the solid material is reduced by drying the solid material deformed into a sheet form.

13. The method of manufacturing a polytetrafluoroethylene sheet according to claim 1, wherein the solid material further is subjected to a step of rolling and/or drawing after the water content is reduced in the step (iii).

14. The method of manufacturing a polytetrafluoroethylene sheet according to claim 1, wherein the solid material further is subjected to a step of firing to temperatures equal to or higher than a melting point of polytetrafluoroethylene, after the water content is reduced in the step (iii).

15. The method of manufacturing a polytetrafluoroethylene sheet according to claim 1, wherein the polytetrafluoroethylene sheet obtained through the step (i) to the step (iii) is a polytetrafluoroethylene seal tape.

16. A method of manufacturing a polytetrafluoroethylene seal tape, the method comprising:

(i)providing a dispersion containing water as a dispersion medium, polytetrafluoroethylene particles, and a surfactant, applying a force to the dispersion, the force making the particles approach or contact with each other, thereby binding the particles to form a deformable polytetrafluoroethylene-containing solid material including the water, the surfactant and the bound particles, and discharging the formed solid material from an outlet of a chamber, wherein the force is applied in the chamber by spraying the dispersion to an inner wall of the chamber or a component placed in the chamber;

(ii) deforming the solid material into a sheet form; and (iii) reducing a content of the water in the solid material deformed into a sheet form.

17. The method of manufacturing a polytetrafluoroethylene sheet according to claim 1, wherein the solid material has substantially the same mass as the dispersion to which the force is applied.

18. A method of manufacturing a polytetrafluoroethylene sheet, the method comprising:

(i) providing a dispersion containing water as a dispersion medium, polytetrafluoroethylene particles, and a surfactant, applying a force to the dispersion, the force making the particles approach or contact with each other, thereby binding the particles to form a deformable polytetrafluoroethylene-containing solid material including the water, the surfactant and the bound particles, and discharging the formed solid material from an outlet of a chamber, wherein the force is applied in the chamber by supplying the dispersion to the chamber through a plurality of feeders, and by colliding the dispersions provided from the plurality of feeders with each other in the chamber;

(ii) deforming the solid material into a sheet form; and (iii) reducing a content of the water in the solid material deformed into the sheet form.

19. The method of manufacturing a polytetrafluoroethylene sheet according to claim 18, wherein the dispersions are collided by spraying the dispersions.

20. The method of manufacturing a polytetrafluoroethylene sheet according to claim 19, wherein the dispersions are sprayed through a nozzle.

21. The method of manufacturing a polytetrafluoroethylene sheet according to claim 18, wherein the solid material has a substantially the same mass as the dispersion to which the force is applied.

22. The method of manufacturing a polytetrafluoroethylene sheet according to claim 18, wherein the particles in the solid material are bound to each other to such an extent as to retain a given form of the solid material, and wherein the solid material contains the water to such an extent that the given form is deformable.

23. The method of manufacturing a polytetrafluoroethylene sheet according to claim 18, wherein the particles in the solid material are bound to each other to such an extent as to be not dispersible in water.

24. The method of manufacturing a polytetrafluoroethylene sheet according to claim 18, wherein the particles in the solid material are bound to each other to such an extent as not to return to particles in response to a reduction in the content of the water in the solid material.

25. The method of manufacturing a polytetrafluoroethylene sheet according to claim 18, wherein the solid material is deformed into a sheet form by rolling.

26. The method of manufacturing a polytetrafluoroethylene sheet according to claim 18, wherein the solid material is deformed into a sheet form by being passed through a flow path having a rectangular or slit-like cross section.

27. The method of manufacturing a polytetrafluoroethylene sheet according to claim 18, wherein the solid material is deformed into a sheet form by being passed through a flow path having a rectangular or slit-like cross section and connected to the chamber.

28. The method of manufacturing a polytetrafluoroethylene sheet according to claim 27, wherein the dispersion is continuously supplied to the chamber, so as to continuously discharge the solid material, deformed into a sheet form, through the flow path.

29. The method of manufacturing a polytetrafluoroethylene sheet according to claim 28, wherein the solid material discharged through the flow path has substantially the same mass as the dispersion supplied to the chamber.

30. The method of manufacturing a polytetrafluoroethylene sheet according to claim 18, wherein the dispersion further contains a filler.

31. The method of manufacturing a polytetrafluoroethylene sheet according to claim 18, wherein the content of the water in the solid material is reducted by drying the solid material deformed into a sheet.

32. The method of manufacturing a polytetrafluoroethylene sheet according to claim 18, wherein the solid material further is subjected to a step of rolling and/or drawing after the water content is reduced in the step (iii).

33. The method of manufacturing a polytetrafluoroethylene sheet according to claim 18, wherein the solid material further is subjected to a step of firming to temperatures equal to or higher than a melting point of polytetrafluoroethylene, after the water is reduced in the step (iii).

34. The method of manufacturing a polytetrafluoroethylene sheet according to claim 18, wherein the polytetrafluoroethylene sheet obtained through the step (i) to the step (iii) is polytetrafluoroethylene seal tape.

35. A method of manufacturing a polytetrafluoroethylene seal tape, the method comprising:

(i) providing a dispersion containing water as a dispersion medium, polytetrafluoroethylene particles, and a surfactant, applying a force to the dispersion, the force making the particles approach or contact with each other, thereby binding the particles to form a deformable polytetrafluoroethylene-containing solid material including the water, the surfactant and the bound particles, and discharging the formed solid material from an outlet of a chamber, wherein the force is applied in the chamber by supplying the dispersion to the chamber through a plurality of feeders, and by colliding the dispersions provided from the plurality of feeders with each other in the chamber;

(ii) deforming the solid material into a sheet form; and (iii) reducing a content of the water in the solid material deformed into the sheet form.

36. A method of manufacturing a polytetrafluoroethylene sheet, the method comprising:

(i) providing a dispersion containing water as a dispersion medium, polytetrafluoroethylene particles, and a surfactant, applying a force to the dispersion, the force making the particles approach or contact with each other, thereby binding the particles to form a deformable polytetrafluoroethylene-containing solid material including the water, the surfactant and the bound particles, and discharging the formed solid material from an outlet of a pipe having a barrier disposed therein, wherein the force is applied by supplying the dispersion to the pipe, thereby making the dispersion contact the barrier, thus inhibiting a flow of the dispersion;

(ii) deforming the solid material into a sheet form; and (iii) reducing a content of the water in the solid material deformed into the sheet form.

37. The method of manufacturing a polytetrafluoroethylene sheet according to claim 36, wherein the dispersion is supplied to the pipe by spraying the dispersion into the pipe.

38. The method of manufacturing a polytetrafluoroethylene sheet according to claim 37, wherein the dispersion is sprayed through a nozzle.

39. The method of manufacturing a polytetrafluoroethylene sheet according to claim 36, wherein the pipe includes a bent portion or a narrowed space.

40. The method of manufacturing a polytetrafluoroethylene sheet according to claim 36, wherein the solid material has substantially the same mass as the dispersion to which the force is applied.

41. The method of manufacturing a polytetrafluoroethylene sheet according to claim 36, wherein the particles in the solid material are bound to each other to such an extent as to retain a given form of the solid material, and wherein the solid material contains the water to such an extent that the given form is deformable.

42. The method of manufacturing a polytetrafluoroethylene sheet according to claim 36, wherein the particles in the solid material are bound to each other to such an extent as to be not dispersible in water.

43. The method of manufacturing a polytetrafluoroethylene sheet according to claim 36, wherein the particles in the solid material are bound to each other to such an extent as not to return to particles in response to a reduction in the content of the water in the solid material.

44. The method of manufacturing a polytetrafluoroethylene sheet according to claim 36, wherein the solid material is deformed into a sheet form by rolling.

45. The method of manufacturing a polytetrafluoroethylene sheet according to claim 36, wherein the solid material is deformed into a sheet form by being passed through a flow path having a rectangular or slit-like cross section.

46. The method of manufacturing a polytetrafluoroethylene sheet according to claim 36, wherein the solid material is deformed into a sheet form by being passed through a flow path having a rectangular or slit-like cross section and connected to the pipe.

47. The method of manufacturing a polytetrafluoroethylene sheet according to claim 46, wherein the dispersion is continuously supplied to the pipe, so as to continuously discharge the solid material deformed into a sheet form, through the flow path.

48. The method of manufacturing a polytetrafluoroethylene sheet according to claim 47, wherein the solid material discharged through the flow path has substantially the same mass as the dispersion supplied to the pipe.

49. The method of manufacturing a polytetrafluoroethylene sheet according to claim 36, wherein the dispersion further contains a filler.

50. The method of manufacturing a polytetrafluoroethylene sheet according to claim 36, wherein the content of the water in the solid material is reduced by drying the solid material deformed into a sheet form.

51. The method of manufacturing a polytetrafluoroethylene sheet according to claim 36, wherein the solid material further is subjected to a step of rolling and/or drawing after the water content is reduced in the step (iii).

52. The method of manufacturing a polytetrafluoroethylene sheet according to claim 36, wherein the solid material further is subjected to a step of firing to temperatures equal to or higher than a melting point of polytetrafluoroethylene, after the water content is reduced in the step (iii).

53. The method of manufacturing a polytetrafluoroethylene sheet according to claim 36, wherein the polytetrafluoroethylene sheet obtained through the step (i) to the step (iii) is a polytetrafluoroethylene seal tape.

54. A method of manufacturing a polytetrafluoroethylene seal tape, the method comprising:

(i) providing a dispersion containing water as a dispersion medium, polytetrafluoroethylene particles, and a surfactant, applying a force to the dispersion, the force making the particles approach or contact with each other, thereby binding the particles to form a deformable polytetrafluoroethylene-containing solid material including the water, the surfactant and the bound particles, and discharging the formed solid material from an outlet of a pipe having a barrier disposed therein, wherein the force is applied by supplying the dispersion to the pipe, thereby making the dispersion contact the barrier, thus inhibiting a flow of the dispersion;

(ii) deforming the solid material into a sheet form; and (iii) reducing a content of the water in the solid material deformed into the sheet form.

* * * * *